(12) United States Patent
Kachelhoffer

(10) Patent No.: US 12,150,217 B2
(45) Date of Patent: Nov. 19, 2024

(54) HEATING CELL AND PTC HEATING DEVICE COMPRISING SUCH

(71) Applicant: Eberspächer catem GmbH & Co. KG, Herxheim (DE)

(72) Inventor: Patrick Kachelhoffer, Seebach (FR)

(73) Assignee: Eberspächer catem GmbH & Co. KG, Herxheim (DE)

( * ) Notice: Subject to any disclaimer, the term of this patent is extended or adjusted under 35 U.S.C. 154(b) by 682 days.

(21) Appl. No.: 17/369,296

(22) Filed: Jul. 7, 2021

(65) Prior Publication Data

US 2022/0015195 A1     Jan. 13, 2022

(30) Foreign Application Priority Data

Jul. 9, 2020 (DE) .................. 10 2020 208 643.5

(51) Int. Cl.
*H05B 3/06* (2006.01)
*B32B 7/12* (2006.01)
*H05B 3/26* (2006.01)

(52) U.S. Cl.
CPC ............... *H05B 3/06* (2013.01); *B32B 7/12* (2013.01); *H05B 3/26* (2013.01); *B32B 2307/304* (2013.01); *B32B 2457/00* (2013.01); *H05B 2203/02* (2013.01)

(58) Field of Classification Search
CPC . B32B 2307/304; B32B 2457/00; B32B 7/12; H05B 2203/02; H05B 3/06; H05B 3/24; H05B 3/26

USPC ........................................................ 219/553
See application file for complete search history.

(56) References Cited

U.S. PATENT DOCUMENTS

| | | | |
|---|---|---|---|
| 5,598,502 A | 1/1997 | Takahashi et al. | |
| 2014/0034634 A1* | 2/2014 | Waechter | H05B 3/24 |
| | | | 219/534 |
| 2016/0360574 A1* | 12/2016 | Bohlender | H05B 3/04 |

FOREIGN PATENT DOCUMENTS

| | | |
|---|---|---|
| DE | 10 2017 209 990 | 12/2018 |
| DE | 10 2017 223 785 | 6/2019 |
| DE | 20 2019 005 220 | 2/2020 |
| EP | 0 026 457 | 4/1981 |
| EP | 2 440 004 | 2/2015 |
| EP | 3 273 177 | 1/2018 |

\* cited by examiner

*Primary Examiner* — Sang Y Paik
(74) *Attorney, Agent, or Firm* — Boyle Fredrickson S.C.

(57) ABSTRACT

A heating cell includes a frame made of electrically insulating material. A PTC element, which is received in a frame opening of the frame. Insulating layers accommodate the PTC element between themselves, are connected to the frame, and at least partially cover a respective main side surface of the PTC element exposed in the frame opening and a frame surface defining the frame opening. Abutment projections project beyond the frame surface and at least partially enclose a circumferentially encircling edge of the insulating layer between themselves.

11 Claims, 2 Drawing Sheets

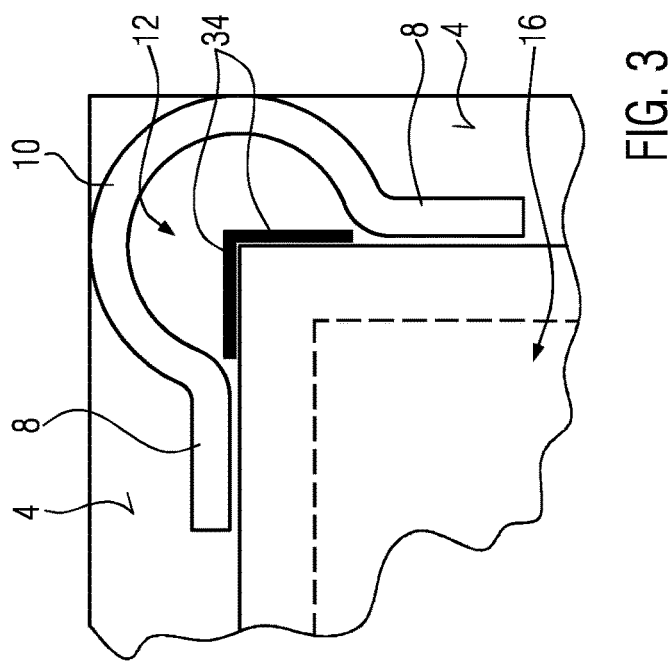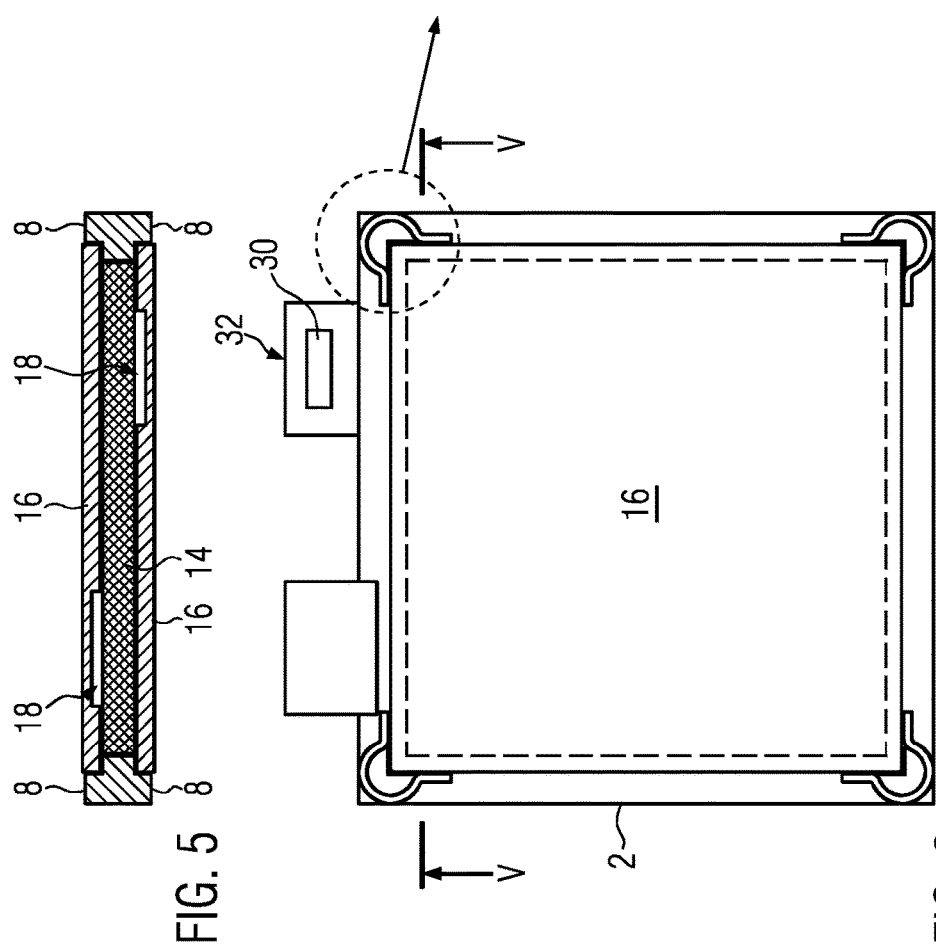

HEATING CELL AND PTC HEATING DEVICE COMPRISING SUCH

BACKGROUND OF THE INVENTION

1. Field of the Invention

The present invention relates to a heating cell with a frame made of electrically insulating material. The heating cell also has a PTC element which is received in a frame opening of the frame. Also provided also insulating layers which accommodate the PTC element between themselves, are connected to the frame, and each cover at least in part a main side surface of the PTC element exposed in the frame opening and a frame surface defining this frame opening.

2. Background of the Invention

Such a heating cell is typically pushed into a receiving chamber of a heating rib. This heating rib can be configured in the form of bulges in a partition wall, as is described, for example, in EP 2 440 009 A1. The casing receiving the heating cell, however, can also be made of relatively thin sheet metal material, for example, in the form of a sleeve which is closed on one side and accommodates the heating cell and protects and seals it against the medium to be heated; cf. EP 3 273 177 A1 or DE 20 2019 005 220 U1, respectively.

The PTC element according to the present invention is a ceramic semiconductor component, the resistance of which becomes so great once the Peltier temperature has been reached that the PTC element becomes practically impermeable to the power current and therefore does not heat up any more. Accordingly, PTC elements have found widespread use as auxiliary heaters in automotive engineering. The self-regulating properties prevent overheating and burnout of the electric heating device produced using the aforementioned heating cell.

In order to enable the ceramic PTC element to function as best as possible in a heater, various functions must be ensured. Firstly, the PTC element must be in good electrical contact and typically without contact resistance. The PTC element must be thermally coupled in an excellent manner to the outer surface of the heating cell. Increased thermal resistance in the heat conduction path from the PTC element to the outer surface of the heating cell reduces the degree of efficiency of the PTC element. In addition, good electrical insulation is required nowadays, in particular for the employment of heating cells for electromobility. The outer surface of the heating cell dissipating the heat must be potential-free, where it must be ensured that this electrical insulation does not fail the requirements in a motor vehicle, where strong vibrations and also temperature fluctuations act over the not inconsiderable lifetime of the components. Heating cells of the aforementioned kind are increasingly being used in electric vehicles, where they are operated with the power current of the drive. Good electrical insulation is then of particular importance.

In view of this, various solutions have been proposed in the past in this regard. It was proposed to effect the electrical contact by way of a wire mesh or the like, which is penetrated by a mass that is thermally highly conductive but electrically insulating, where an insulating film that covers the PTC element is additionally provided on the outer side, cf. DE 10 2017 223 785 A1. This is to ensure good heat extraction with good electrical insulation toward the outside.

It has also been proposed that the PTC element should not be energized via its main side surface, but rather via a circumferential edge.

The PTC element is typically cuboid-shaped and configured having more the shape of a plate. The circumferential edge then has a small height compared to the dimensions of the main side surface. Their surface is typically larger by a factor of at least 5 than each individual face side surface that connects the two main side faces with one another.

In any case, the heat is typically extracted via the main side surfaces. In the generic heating cell, they are also exposed in the frame opening. The frame typically has a smaller thickness than the PTC element, so that the insulating layer abutting directly on the outside against the PTC element can abut against the frame over the entire surface.

SUMMARY

The present invention seeks to specify a heating cell of the kind mentioned at the outset which, in an improved manner, meets the combinational requirements for the electrical contact, electrical insulation to the outside, and good heat extraction. In addition, the heating cell is to be economical to manufacture. The present invention also seeks to specify a correspondingly improved PTC heating device.

To satisfy this object, the present invention proposes a heating cell comprising a frame which is made of electrically insulating material, a PTC element which is received in a frame opening of the frame, and insulating layers. The insulating layers accommodate the PTC element between themselves, are connected to the frame, and at least partially surround a respective main side surface of the PTC element that is exposed in the frame opening and a frame surface that defines the frame opening are at least partially covered. The frame has abutment projections that project beyond the frame surface and that at least partially enclose a circumferentially encircling edge of each of the insulating layers between themselves.

The frame surface is the surface that defines the frame opening. The frame surface is typically flat. The frame surfaces are typically parallel to the main side surfaces of the PTC element. The frame surface defines the edge behind which the frame opening is disposed.

The insulating layer extends parallel to the frame surface. The insulating layer typically abuts directly against the frame surface on one side, whereas the insulating layer may be slightly spaced from the frame surface on the oppositely disposed side due to the greater thickness of the PTC element as compared to the thickness of the frame. Sealing the PTC element within the frame opening is not crucial for the present invention. This is for the reason that it is assumed that the heating cell according to the invention to form a PTC heating device is introduced as a preassembled unit into a casing that typically encloses the heating cell and is only open on one side on which of connection lugs for the electrical connection of the PTC element project beyond the casing. This casing can be formed from sheet metal material which is configured as a cylinder or a sleeve and closed on both sides, where the connection lugs are electrically insulated on one side and received in a sealed manner against the interior of the casing which accommodates the heating cell. The casing can also be formed by a heating rib which has walls that are thick as compared thereto and which projects from a partition wall that separates a connection chamber, for the electrical connection of the connection lugs to the power current, from a heating chamber into which the casing projects as a heating rib (cf. EP 2 440 004 A1).

According to the present invention, abutment projections for the insulating layer reach beyond the frame surface. These abutment projections entirely or in part enclose a circumferentially encircling edge of the insulating layer. The abutment projections are typically provided as discrete abutment projections protruding from the frame surface spaced from one another. The abutment projections serve to position the insulating layer on the frame surface, so that the insulating layer covers the frame opening as completely as possible and thus covers part of the frame surface and the insulating layer covers and projects beyond the main side surface of the PTC element in every direction. Direct contact with the PTC element in the direction of passage of the heat, i.e. orthogonal to the main side surface of the PTC element, is then not possible. The PTC element is encapsulated in a completely electrically insulated manner in the circumferential direction by the frame and by the two insulating layers. The insulating layer is subsequently abutted against the frame and connected thereto. The abutment projections serve to position the insulating layer relative to the frame opening.

The abutment projections can themselves attach the associated insulating layer to the frame. However, according to the concept of the present invention, this attachment need only be a temporary attachment. The abutment projections themselves have an extension in the longitudinal direction of the edge of the insulating layer associated with them, which typically corresponds to no more than 10% of the edge length of an edge section of the insulating layer. For the implementation of the present invention, it is sometimes sufficient to provide abutment projections only at two diagonally opposite corners of an insulating layer. Two abutment projections are typically provided at one or each corner, respectively, and enclose the corner between themselves and position the insulating layer relative to the frame.

The insulating layer can be formed by any random insulating layer described in prior art. The insulating layer can be formed by or comprise in particular a ceramic plate.

Due to the cuboid configuration of the PTC element, it is advisable to select the frame as a rectangular frame and also to shape the insulating layers to be rectangular. However, other geometric configurations are also conceivable.

According to a possible development of the present invention, the abutment projections are used not only for positioning during assembly and for holding the insulating layer after assembly of the same on the frame. They form an adhesion chamber between themselves in the region of a corner of the insulating layer which is defined on the inside by the insulating layer and on the outside by a connection segment which extends between the two abutment projections that are arranged corner to corner and is typically connected to them. In this embodiment, the connection segment and the abutment projections are provided uniformly on the frame by way of injection molding. The connection segment is fastened to the frame surface. The adhesion chamber is then also defined by the frame surface and by the two abutment projections and the connection segment provided therebetween. An adhesive that connects the insulating layer to the frame is received in the adhesion chamber. This adhesive may be an adhesive that is curable by UV rays and is introduced into the adhesion chamber before or after the insulating layer has been abutted against the frame and is immediately thereafter exposed to UV radiation, so that this adhesive cures quickly and within a few seconds. This ensures that the insulating layer is adequately attached to the frame. Both insulating layers can be connected to the frame in this way. Following the adhesive bonding, a heating cell that can be incorporated into the casing is created as a structural unit.

After the arrangement in the casing, the insulating layers each with their outer surface abut in a planar manner against the inner surface of the casing. This inner surface is typically planar and not contoured. An abutment projection or a connection segment does not project beyond the insulating layer in the thickness direction, at least after the installation into the casing. For this purpose, the connection segments and/or an abutment projection are produced from the outset having a dimension that at least does not project beyond the frame surface by a height that is greater than the thickness of the insulating layer.

As can be seen from the above description of the invention and developments thereof, the abutment projections are configured to be adapted to position the insulating layer and/or to hold the insulating layer on the frame The Insulating layer can be attached to the frame directly by the connection segments, e.g. by clamping or a force-fit connection, or by applying adhesive adjacent to or directly onto the connection segments. The adhesion chamber previously mentioned takes into account tolerances in the application of adhesive onto the frame surface. Due to the capillary action, adhesive applied in liquid form typically flows between a gap which is formed between the insulating layer and the frame surface and/or one of the abutment projections. The connection and therefore the positive substance-fit attachment of the insulating layer to the frame is effected in this manner.

According to a further embodiment of the present invention, connection lugs project beyond the frame in a manner known per se. The connection lugs may project beyond the frame on the same side. These connection lugs abut on oppositely disposed sides against the PTC element for energizing the latter. The present invention assumes that the connection lugs are in direct contact with the surface of the PTC element. The PTC element there comprises a metallization which is applied to the ceramic material and which is suitable for distributing a voltage, applied in a rather punctiform manner to the main side surface of the PTC element, over the entire main side surface, so that current can flow over the entire thickness through the PTC element and heat it.

In the configuration presently discussed, the insulating layer can be configured having a connection lug receiving chamber. This connection lug receiving chamber is recessed relative to an abutment surface of the insulating layer with which the insulating layer abuts in a planar manner against the PTC element. The connection lug receiving chamber is accordingly configured to receive the connection lug. Accordingly, either the connection lug abuts in an electrically conductive manner or the insulating layer abuts against the substantially planar surface of the PTC element. In any case, the predominant surface area of the insulating layer abuts directly against the PTC element, so that the heat generated there can pass through the insulting layer without any further intermediate layer to the outer side of the heating cell, which is formed on the main side surface by the respective outer surface of the insulating layer. This outer surface of the insulating layer may also represent the outer surface of the heating cell which extends parallel to a main side surface of the PTC element.

The connection lug may be formed by a piece of sheet metal forming at least one spring tongue which is formed integrally on the former and which abuts against the PTC element subject to bias. This spring bias is there held and supported by the abutment of the connection lug against the insulating layer. The connection lug can also be introduced into the connection lug receiving chamber only after the heating cell has been installed in a casing of the heating device. With a sufficiently secure attachment of the insulating layer to the frame, however, the connection lug can also be connected to the PTC element prior to the heating cell being installed in the casing.

According to a development, the connection lug is formed by a piece of sheet metal which has at least one latch tongue integrally formed thereon. This latch tongue is received in a latch receptacle formed by the frame. Due to the positive-fit connection of the latch tongue and the latch receptacle, the connection lug is secured in a positive-fit manner to the frame after having been introduced into the frame.

According to its independent aspect, the present invention proposes a PTC heating device with a casing which may be formed from sheet metal material. The casing almost entirely surrounds the PTC heating cell described above. The insulating layers of the heating cell each abut in a planar manner against an inner surface of the casing. As already mentioned, after installation, the abutment projections in any case do not project beyond the associated insulating layer in their thickness direction. The insulating layers accordingly each abut with their outer surface in a planar manner against an inner surface of the casing. Only the connection lugs project beyond the casing on the outside, so that the heating cell provided with the connection lugs is received in the casing in a plug-in manner. The connection lugs project beyond the casing on one side and abut in an electrically conductive manner on oppositely disposed sides against the PTC element to energize the latter with different polarities.

BRIEF DESCRIPTION OF THE DRAWINGS

Further details and advantages of the present invention shall become apparent from the following description of an embodiment in combination with the drawing, in which:

FIG. 2 shows a top view onto the embodiment according to FIG. 1 after all components have been assembled;

FIG. 3 shows an enlarged detail of a corner according to the illustration of FIG. 2;

FIG. 4 shows an upper top view onto the heating cell; and

FIG. 5 shows a sectional view along the line V-V according to FIG. 2.

DETAILED DESCRIPTION

Figure 1:
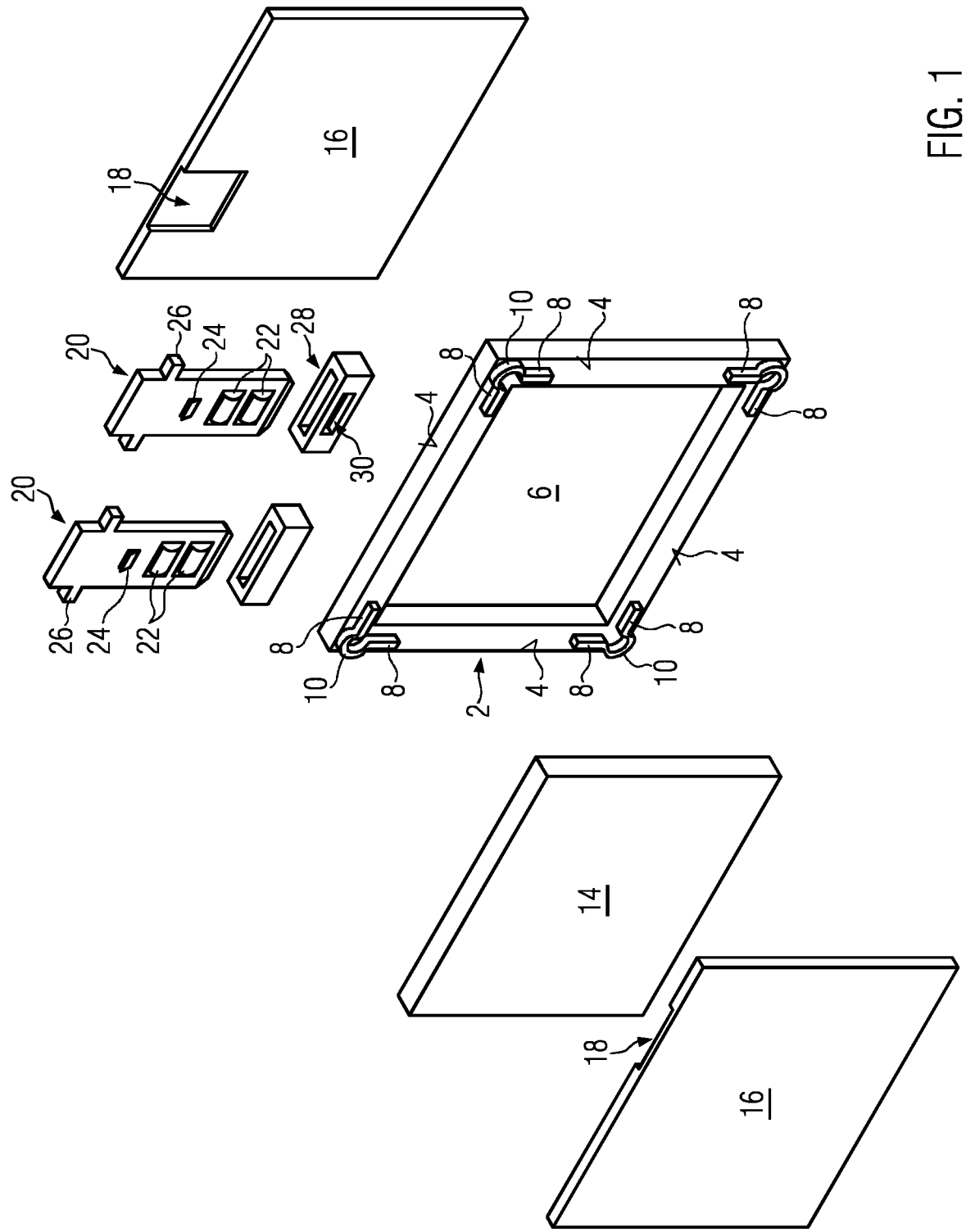
FIG. 1 shows an exploded view of the embodiment of a heating cell.

FIG. 1 shows a perspective exploded view of the components of an embodiment of a heating cell with a frame 2 which comprises oppositely disposed frame surfaces 4 that define an edge to a frame opening 6 and that each comprise four surface segments extending orthogonally to one another. Abutment projections 8 project in the region of the corners from the frame surface 4. Two such abutment projections 8 are provided for each corner. A connection segment 10 extends in each corner between these abutment projections 8 and bridges the corner of the frame 2 and directly adjoins the abutment projections 8. An adhesion chamber 12 is formed at each corner between the abutment projections 8 provided in pairs of each corner and surrounded on the outside by the connection segment 10.

Reference numeral 14 in FIG. 1 denotes a PTC element which fits into the frame opening 6 and can accordingly be arranged between the frame surfaces 4. Reference numeral 16 denotes insulating layers which on the outside form a flat outer surface of the heating cell and on the inside likewise have a flat abutment surface for direct contact with the PTC element 14, which abutment surface, however, being interrupted in the upper region by a connection lug receiving chamber 18 which is stepped in the direction toward the outer surface and is formed to be adapted to receive one of the connection lugs denoted by reference numeral 20.

These connection lugs 20 presently each have two spring tongues 22 which by punching and bending project from the plane of the sheet metal material forming the connection lug 20 in the direction towards the PTC element 14 and can be abutted in a resilient manner against the PTC element 14. A latch tongue 24 formed by punching and bending projects in the same direction from the sheet metal material of the connection lug. In an installed position, webs 26 abut on the upper side against a receiving box 28 which is formed integrally on the frame 2 and forms a latch opening 30 for receiving the latch tongue 24. The receiving boxes 28 each have a longitudinal slot 32 which is adapted to receive the connection lug 20 and, in the assembled state, is aligned with the connection lug receiving chamber 18 (cf. FIG. 4).

To assemble the heating cell, one of the insulating layers 16 is first abutted against the frame surface 4 of the previously injection-molded frame 2. UV-curing adhesive is then introduced into each of the adhesion chambers 12. In the embodiment shown, this adhesive bonds in the region of adhesion surfaces which are denoted by reference numeral 34 in FIG. 3. Each of the four corners in the embodiment is respectively provided with an adhesion chamber 12 on each of the frame surfaces 4. However, it is also considered sufficient for attaching the insulating layer 16 to the frame 2 to form abutment projections 8 with associated connection segments 10 and therefore adhesion chambers 12 only at diagonally oppositely disposed corners. As illustrated in FIG. 2, the insulating layer 16 then is disposed entirely over the main side surface of the PTC element and covers the frame surface 4 at least in part.

The sectional view according to FIG. 5 illustrates that the abutment projection 8 and the connection segment 10 do not project beyond the insulating layer 16 in the thickness direction. The outer surface of the heating cell extending parallel to the main side surface of the PTC element 14 is accordingly formed by the outer surface of the insulating layers 16.

After the insulating layer 16 has been applied on one side and connected to the frame 2, the PTC element 14 is introduced into the frame opening 6 which is now closed on the underside. The other insulating layer 16 is then applied thereafter from the oppositely disposed side, as described above, and adhesively bonded to the frame 2.

Thereafter, the connection lugs 20 are typically introduced via the longitudinal slots 32 into the connection lug receiving chambers 18 associated with the former. The heating cell preassembled in this manner can be handled as an integral component and introduced into a casing of a PTC heating device. This casing can be a sheet metal sleeve which abuts, subject to resilient expansion, against the outer surface of the heating cell when the PTC heating cell is introduced, so that good heat transfer to the outer side of the casing is created. Alternatively, the casing can also be deformed after the heating cell has been introduced, so that the casing is also abutted without an air gap and/or adhesive against the outer surfaces of the heating cell in the main direction of extension of the PTC element 14.

If necessary, the heating cell can also be inserted into a wedge element which can be inserted into a casing in the form of a heating rib and braced there so that good heat dissipation from the heating cell into a heating chamber is possible.

The example of a PTC heating cell shown in the figures can be exposed in a casing within this casing in a heating chamber for heating a fluid. Such a casing made of elongate tubular sheet metal material can be gathered, for example, from EP 3 273 177 A1. The heating cell according to the invention can also be used in an electrical heating device produced in such a way.

The heating cell can also be introduced into an envelopment as is known from EP 2 440 004 A1. Such an envelopment projects from a partition wall which separates a connection chamber from a heating chamber. The envelopment is typically formed to be wedge-shaped and the receptacle for the heating cell then also has outer walls that run at an angle to one another. The aforementioned heating cell can be introduced, for example, into a housing that forms wedge surfaces which together with the housing directly contact the inner surfaces of the receptacle in a thermally conductive manner after the heating cell has been introduced. Finally, it is also possible to surround the previously mentioned heating cell with a frame made of an insulating plastic material according to EP 3 101 364 A1 which by itself forms the above-mentioned partition wall or is plug-connected thereto. The heating cell can also be received in a sleeve-shaped casing closed on the underside, where the end of this casing, beyond which the connection lugs project, is provided with a sealing collar which is received in a plugged manner sealed in a plug-in receptacle which is recessed in the partition wall, as is described in DE 20 2019 005 220.

The invention claimed is:

1. A heating cell comprising:
a frame which is made of electrically insulating material;
a PTC element which is received in a frame opening of the frame;
insulating layers which accommodate the PTC element between themselves, which are connected to the frame, and by which a respective main side surface of the PTC element that is exposed in the frame opening and a frame surface that defines the frame opening are at least partially covered; wherein
the frame has abutment projections that project beyond the frame surface and that at least partially enclose a circumferentially encircling edge of each of the insulating layers between themselves; wherein
two abutment projections are associated with a corner of the insulating layer, wherein a connection segment extends between the two abutment projections to form an adhesion chamber at the corner of the insulating layer, wherein the adhesion chamber is bounded on the inside by the insulating layer and on the outside by the connecting segment, and wherein an adhesive is applied within the adhesion chamber and connects the insulating layer to the frame.

2. The heating cell according to claim 1, wherein the two abutment projections enclose the insulating layer between themselves on oppositely disposed sides of the corner.

3. The heating cell according to claim 2, wherein the adhesive is cured by UV rays.

4. The heating cell according to claim 2, wherein the connection segment does not project beyond the insulating layers in a thickness direction of the insulating layers.

5. The heating cell according to claim 2, wherein the connection segment is formed integrally on the frame.

6. The heating cell according to claim 1, wherein the abutment projections do not project beyond the insulating layers in a thickness direction of the insulting layers.

7. The heating cell according to claim 1, wherein the abutment projection is formed integrally on the frame.

8. The heating cell according to claim 1, wherein connection lugs project beyond opposite sides of the frame and abut against the PTC element in an electrically conductive manner for energizing the PTC element with different polarities, and wherein each insulating layer forms a respective connection lug receiving chamber which is recessed relative to an abutment surface of the insulating layer, with which the insulating layer abuts in a planar manner against the PTC element, and which is adapted to receive one of the connection lugs.

9. The heating cell according to claim 8, wherein each connection lug is formed by a piece of sheet metal forming at least one spring tongue which is formed integrally on the connection lug and which abuts against the PTC element subject to bias and which is held by the abutment of the connection lugs against the insulating layer.

10. The heating cell according to claim 8, wherein each connection lug is formed by a piece of sheet metal forming at least one latch tongue which is formed integrally on the connection lug and which is received in a latch receptacle formed by the frame.

11. A PTC heating device comprising:
a PTC heating cell including
a frame made of electrically insulating material;
a PTC element which is received in a frame opening of the frame;
insulating layers which accommodate the PTC element between themselves, which are connected to the frame, and by which a respective main side surface of the PTC element that is exposed in the frame opening and a frame surface that defines the frame opening are at least partially covered;
wherein the frame has abutment projections that project beyond the frame surface and that at least partially enclose a circumferentially encircling edge of the insulating layer between themselves,
wherein two abutment projections are associated with a corner of the insulating layer, wherein a connection segment extends between the two abutment projections to form an adhesion chamber at the corner of the insulating layer, wherein the adhesion chamber is bounded on the inside by the insulating layer and on the outside by the connecting segment, and wherein an adhesive is applied within the adhesion chamber and connects the insulating layer to the frame, wherein.

* * * * *